(12) United States Patent
Kao

(10) Patent No.: US 7,296,741 B1
(45) Date of Patent: Nov. 20, 2007

(54) UNIVERSAL CARD READER

(75) Inventor: Chuan-Chao Kao, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 11/450,684

(22) Filed: Jun. 9, 2006

(51) Int. Cl.
*G06K 7/06* (2006.01)

(52) U.S. Cl. .................. 235/441; 235/439; 235/440

(58) Field of Classification Search ............ 235/441, 235/439
See application file for complete search history.

(56) References Cited

U.S. PATENT DOCUMENTS

| | | | |
|---|---|---|---|
| 5,559,315 A * | 9/1996 | Nair et al. ............... | 235/448 |
| 6,234,389 B1 * | 5/2001 | Valliani et al. ........... | 235/380 |
| 6,738,259 B2 * | 5/2004 | Le et al. ................. | 361/737 |
| 6,832,281 B2 * | 12/2004 | Jones et al. ............. | 710/301 |
| 6,835,100 B1 * | 12/2004 | Chen ..................... | 439/630 |
| 2004/0033722 A1 * | 2/2004 | Liu et al. ................ | 439/630 |
| 2005/0258243 A1 * | 11/2005 | Hsieh .................... | 235/441 |
| 2006/0237539 A1 * | 10/2006 | Chang et al. ............ | 235/441 |

\* cited by examiner

*Primary Examiner*—Michael G. Lee
*Assistant Examiner*—Paultep Savusdiphol
(74) *Attorney, Agent, or Firm*—Tung & Associates

(57) ABSTRACT

A universal card reader is disclosed. The universal car reader includes a housing having a card slot and a dynamic input area for a memory card provided in the card slot. A controller chip is connected to the dynamic input area for the reading and/or writing of data on the memory card.

20 Claims, 6 Drawing Sheets ously described, multiple cards must be available to match the specifications of different types of memory cards. Another problem related to the use of small memory cards is that the orientation of the card must be correct in order to facilitate reading or writing of data onto the memory card.

UNIVERSAL CARD READER

FIELD OF THE INVENTION

The present invention relates to memory cards used to read and/or write data. More particularly, the present invention relates to a universal card reader which is capable of accommodating memory cards of various sizes and configurations and in various positions.

BACKGROUND OF THE INVENTION

Flash memory provides convenience to the storage of data when data storage needs are single, independent or temporary. Flash memory cards eliminate the need to install a large capacity of memory when such capacity is not needed. Therefore, flash memory cards have recently become a common means of storing and managing data for a particular application.

There exist multiple types of memory cards for use in various consumer electronic products such as PDAs (personal digital assistants), personal computers, digital cameras and MP3 players, for example. Each type of memory card requires a special card reader due to the various sizes, shapes and electronic interfaces of the cards. Therefore, a user must know the insert direction and orientation of a particular memory card in order to properly and precisely insert the memory card into a card reader.

Accordingly, a universal card reader is needed which is capable of accommodating a memory card of any size or configuration and in any orientation to properly match the memory card specifications to a read/write apparatus in order to read and/or write data on the memory card.

SUMMARY OF THE INVENTION

The present invention is generally directed to a universal card reader for a memory card. The universal card reader includes a housing having a card slot and a dynamic input area for a memory card provided in the card slot. A controller chip is connected to the dynamic input area for the reading and/or writing of data on the memory card.

BRIEF DESCRIPTION OF THE DRAWINGS

The invention will now be described, by way of example, with reference to the accompanying drawings, in which.

DETAILED DESCRIPTION OF THE INVENTION

Figure 6:
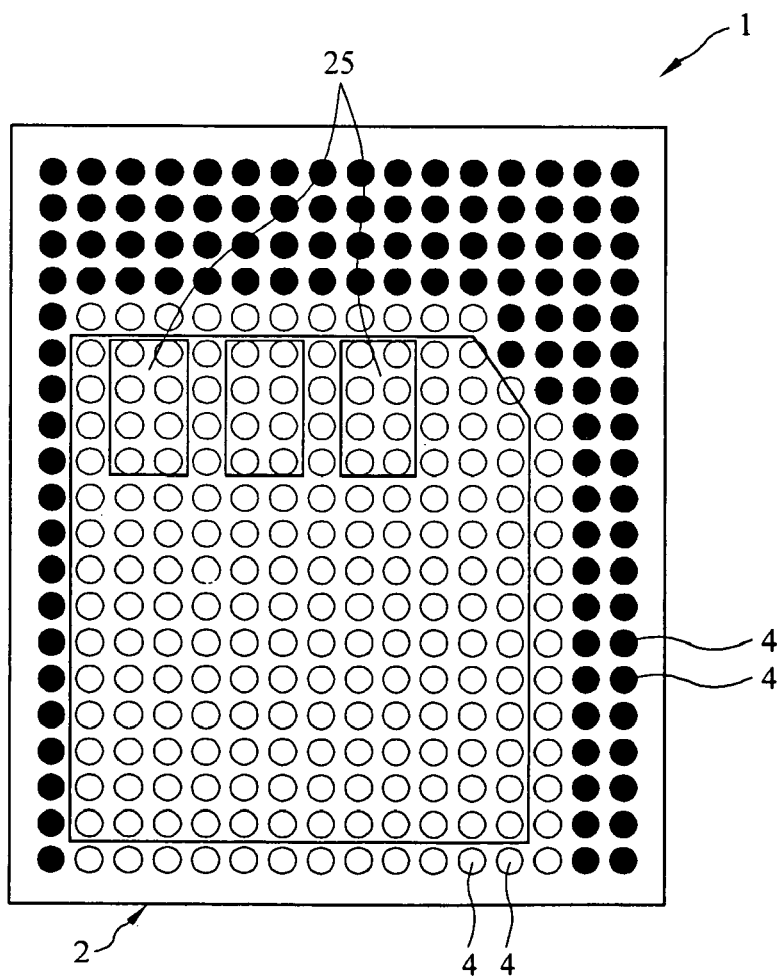
FIG. 6 is a top view of the lower vertical pins in the universal card reader, illustrating a memory card inserted in the universal card reader and multiple lower vertical pins which together define the size and shape of the memory card displaced in the respective pin cavities and the remaining pins extended from the respective pin cavities.
Figure 7:
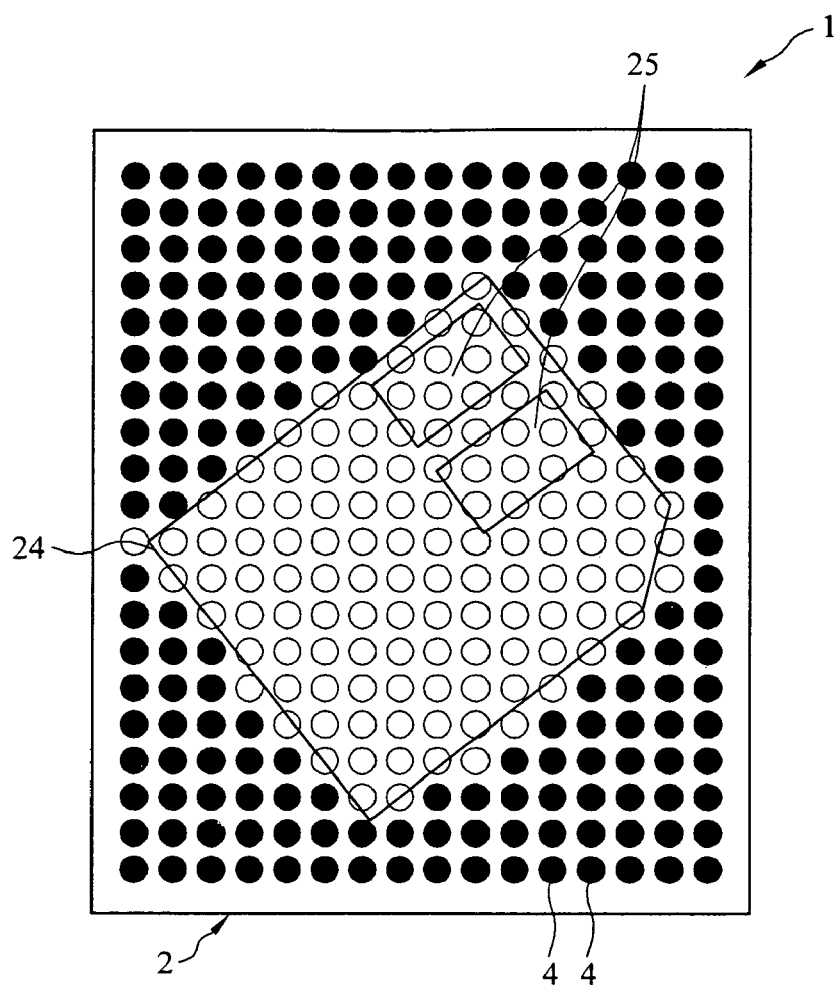
FIG. 7 is a top view of the lower vertical pins in the universal card reader, illustrating a memory card inserted in the universal card reader and shown in a shifted configuration.

Referring to the drawings, an illustrative embodiment of the universal card reader according to the present invention is generally indicated by reference numeral 1. As will be hereinafter described, the universal card reader 1 is designed to accommodate memory cards of various size, configuration and design in any of various orientations to facilitate reading and/or writing data by a read/write apparatus (not shown). The universal card reader 1 includes a housing 2 having a card slot 3. An array or matrix of multiple lower vertical pins 4 and multiple upper vertical pins 4a extend into the card slot 3. As shown in FIGS. 6 and 7, the lower vertical pins 4 and upper vertical pins 4a are preferably arranged in adjacent relationship to each other in a matrix of intersecting rows and columns.

Figure 2:
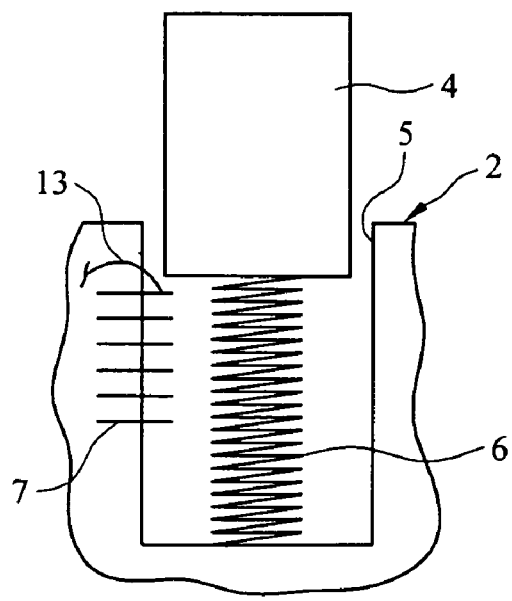
FIG. 2 is a cross-sectional view of a pin cavity, with a spring-loaded pin provided in the pin cavity, more particularly illustrating an electronic probe for detecting shifting of the pin in the pin cavity.
Figure 3:
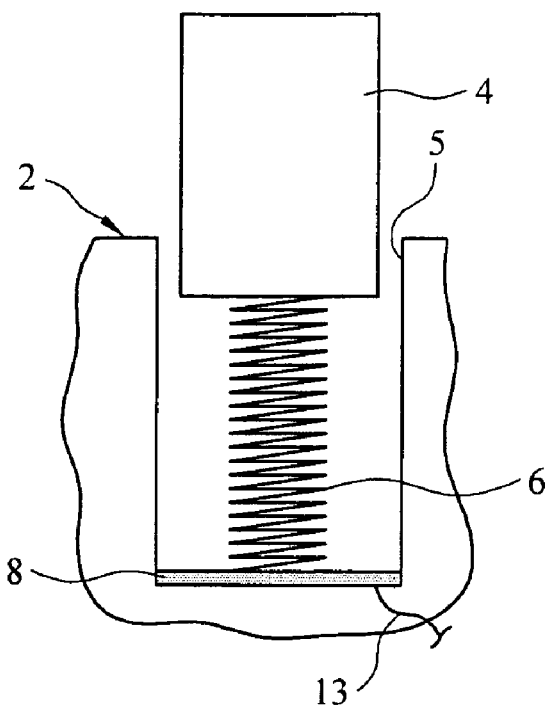
FIG. 3 is a cross-sectional view of a pin cavity, with a spring-loaded pin provided in the pin cavity, more particularly illustrating a pressure sensor provided in the pin cavity for detecting shifting of the pin in the pin cavity.

As shown in FIGS. 2 and 3, each of the lower vertical pins 4 and upper vertical pins 4a is accommodated in a pin cavity 5 provided in the housing 2. A spring 6 or other bias mechanism is provided in the pin cavity 5 and normally biases the lower vertical pin 4 or upper vertical pin 4a such that the pin extends from the corresponding pin cavity 5. As shown in FIG. 2, an electronic probe 7 may be provided in the side of the pin cavity 5 and connected to a controller chip 15 typically by pin wiring 13 to sense the position of the lower vertical pin 4 or upper vertical pin 4a in the corresponding pin cavity 5. Alternatively, as shown in FIG. 3, a pressure sensor 8 may be provided in the bottom of the pin cavity 5 and connected to the controller chip 15 by pin wiring 13 to sense the position of the lower vertical pin 4 or upper vertical pin 4a in the pin cavity 5, depending on the pressure exerted by the spring 6 against the pressure sensor 8 as will be hereinafter described.

Figure 1:
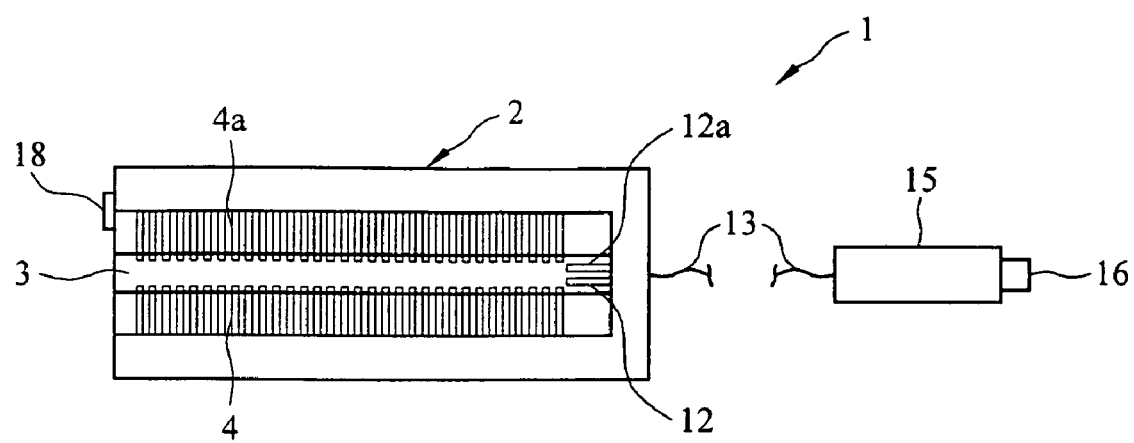
FIG. 1 is a cross-sectional view of an illustrative embodiment of the universal card reader according to the present invention.
Figure 4:
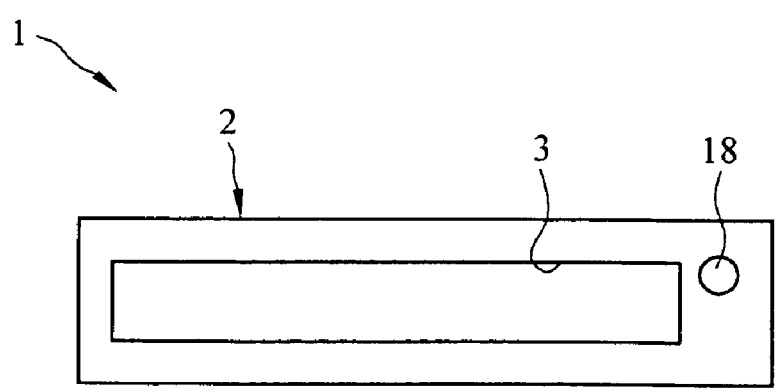
FIG. 4 is a front view of the universal card reader.
Figure 5:
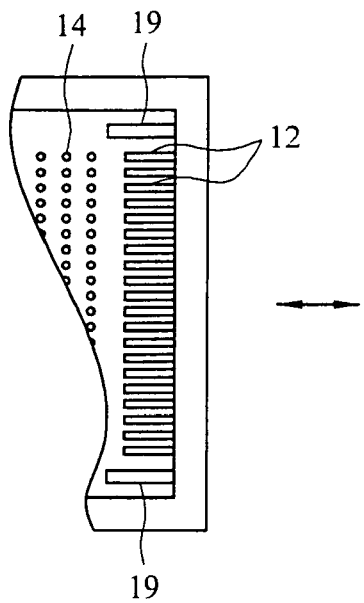
FIG. 5 is a sectional view of a portion of the universal card reader, illustrating multiple lower vertical pins and multiple lower horizontal pins in top view.

As further shown in FIG. 1, multiple horizontal pins, such as multiple, adjacent lower horizontal pins 12 and upper horizontal pins 12a, for example, extend from the wall of the housing 2, into the card slot 3. Each of the lower horizontal pins 12 and upper horizontal pins 12a is typically seated in a corresponding pin cavity 5 (FIGS. 2 and 3) and extended therefrom by a spring 6 or other bias mechanism, as was heretofore described with respect to the lower vertical pins 4 and upper vertical pins 4a. The pin cavity 5 may be fitted with an electronic probe 7 (FIG. 2) or a pressure sensor 8 (FIG. 3) connected to the controller chip 15 typically by pin wiring 13, as was heretofore described. As shown in FIGS. 4 and 5, a card ejection button 18 may be provided on the front of the housing 2 and connected to a card ejection mechanism 19 (FIG. 5), according to the knowledge of those skilled in the art, to facilitate ejecting a memory card from the slot 3, as will be hereinafter described. It will be understood that additional rows of horizontal pins, in addition to the lower horizontal pins 12 and the upper horizontal pins 12a, may be provided on the housing 2 and extend into the card slot 3.

Each of the pins 4, 4a, 12 and 12a may have a generally cylindrical configuration. Alternatively, as shown in FIG. 8A, the tip of each of the pins 4, 4a, 12 and 12a may have a generally conical configuration. Preferably, each pin 4, 4a, 12 and 12a has a length of from about 0.1 mm to about 10 mm and a width or diameter of from about 0.01 mm to about 2.0 mm. Each pin may be copper, steel, aluminum or other electrically conductive material.

Figure 8:
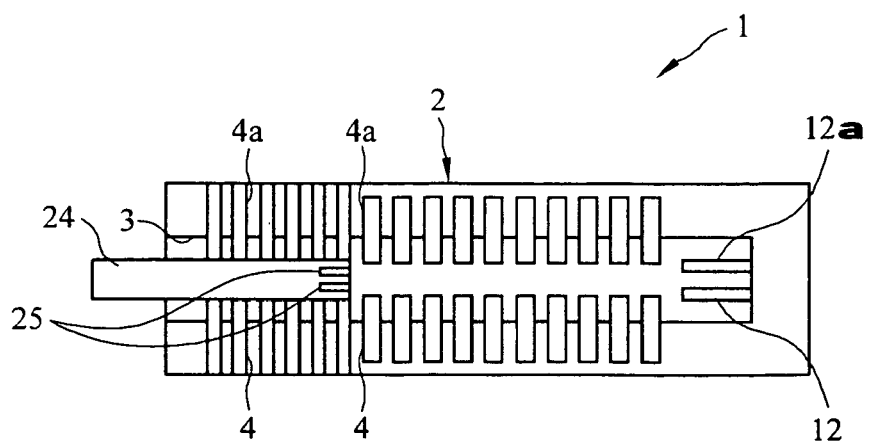
FIG. 8 is a cross-sectional view of the universal card reader, illustrating partial insertion of a memory card having terminal electrical contacts into the universal card reader.
Figure 8A:
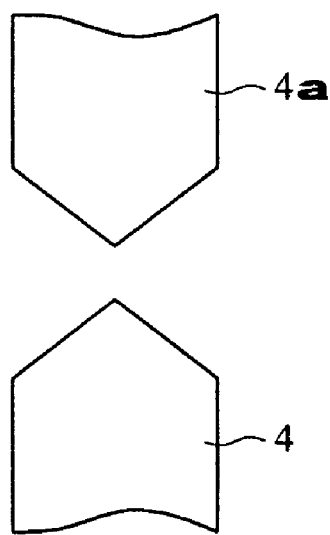

As shown in FIGS. 6-11, the card slot 3 is designed to accept a memory card 24 which may be an MMC (Multi-Media Card), an SD (Secure Digital) card, an SM (Smart Media) card, a CF (Compact Flash) card, an XD card or a Macrodrive card, for example. These different types of memory cards 24 vary in size and configuration, as well as the number and location of the electrical contacts 25 on the memory card 24. For example, as shown in FIG. 8, some types of memory cards 24 have electrical contacts 25 which are located on the end of the memory card 24, whereas other types of memory cards 24 have electrical contacts 25 which are located on the lower surface, the upper surface or both the lower and upper surfaces of the memory card 24. As it is pushed into the card slot 3, the memory card 24 pushes the lower vertical pins 4 and the upper vertical pins 4a into the respective pin cavities 5 (FIGS. 2 and 3), against the bias imparted by each spring 6. The remaining pins 4, 4a which are not contacted by the memory card 24 remain extended from the respective pin cavities 5, as indicated by the dark circles in FIGS. 6 and 7. Therefore, the pins 4, 4a which are pushed into the respective pin cavities 5 by the memory card 24 together correspond to the size, configuration and orientation of the memory card 24 in the card slot 3, as indicated by the light-colored circles in FIGS. 6 and 7. The controller chip 15 is configured to sense the type of memory card 24 which is inserted in the card slot 3 by which of the pins 4, 4a are pressed into the respective pin cavities 5. This is carried out by transmission of a signal from the electronic probe 7 (FIG. 2) or the pressure sensor 8 (FIG. 3) of each pressed pin 4, 4a to the controller chip 15. In the foregoing manner, the controller chip 15 uses the size and shape of the memory card 24 to determine the card type.

Figure 9:
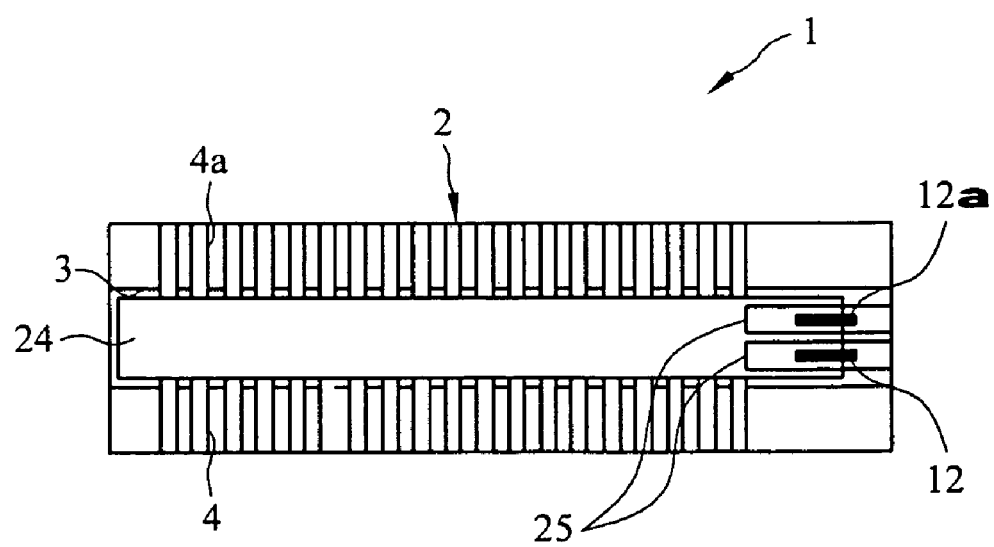
FIG. 9 is a cross-sectional view of the universal card reader, illustrating complete insertion of a memory card having terminal electrical contacts into the universal card reader and further illustrating horizontal pins of the universal card reader disposed in contact with the terminal electrical contacts of the memory card.
Figure 10:
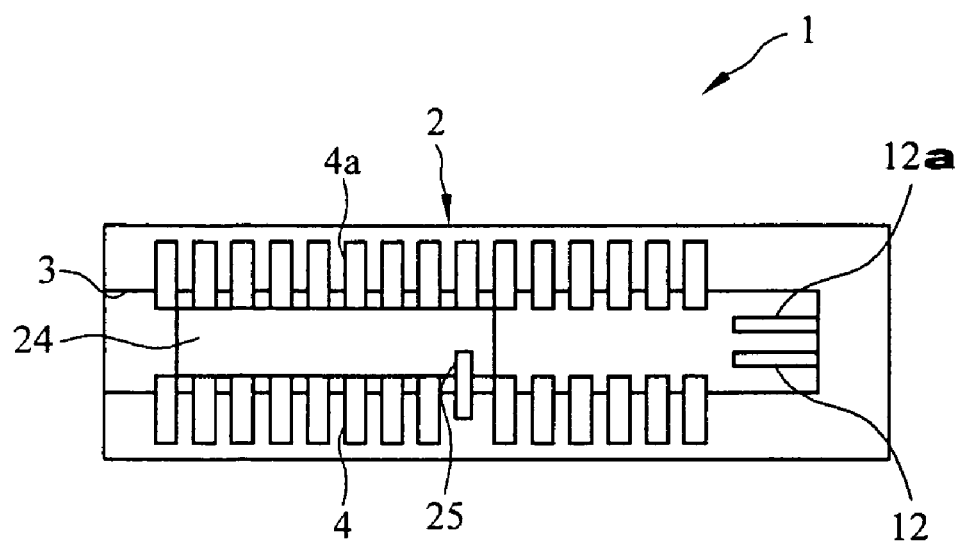
FIG. 10 is a cross-sectional view of the universal card reader, illustrating insertion of a memory card into the universal card reader and further illustrating a lower horizontal pin disposed in electrical contact with a bottom electrical contact provided on the bottom of the memory card.
Figure 11:
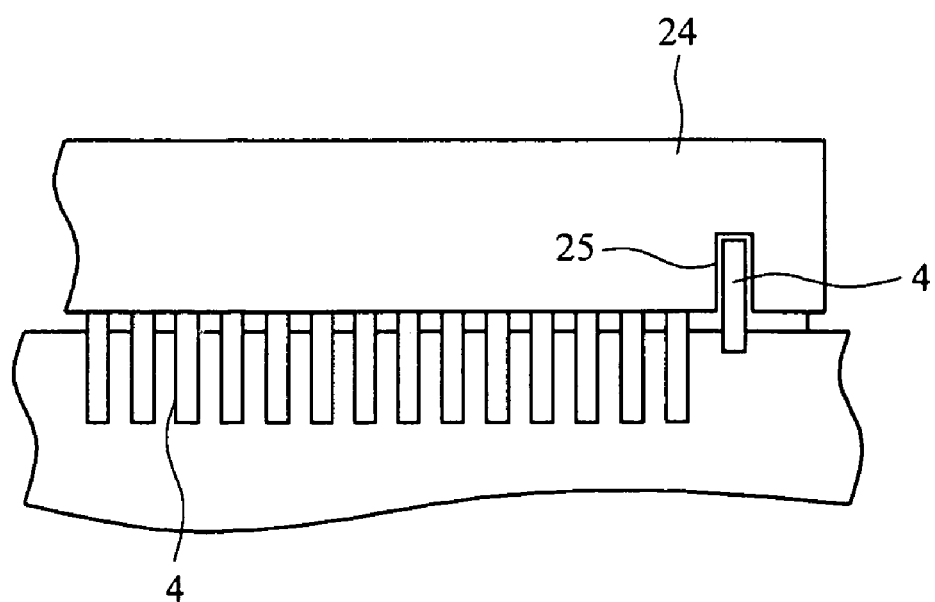
FIG. 11 is an enlarged sectional view illustrating the lower horizontal pin disposed in electrical contact with the bottom electrical contact provided on the bottom of the memory card.

When the card 24 is inserted in the card slot 3, one or more of the pins 4, 4a contacts the electrical contacts 25 on the memory card 24, as shown in FIGS. 6, 7, 10 and 11. Alternatively, in the event that the electrical contacts 25 are located on the end of the memory card 24, the lower horizontal pins 12 and/or upper horizontal pins 12a contact the electrical contacts 25 on the memory card 24, as shown in FIG. 9. Therefore, based on the type of memory card 24 which was previously determined by the controller chip 15 to be in the card slot 3, as was heretofore described, the controller chip 15 is capable of determining whichever of the lower vertical pins 4, upper vertical pins 4a, lower horizontal pins 12 or upper horizontal pins 12a contacts the electrical contacts 25 and is to be used to read and/or write data on the memory card 24. The controller chip 15 is further capable of configuring those single or grouped pins 4, 4a or 12, 12a as the single I/O for the read/write apparatus (not shown). Accordingly, the grouped pins 4, 4a or 12, 12a form a dynamic input area which contacts the electrical contacts 25 of the memory card 24.

According to a typical mode of operation of the universal card reader 1, a memory card 24 is inserted into the card slot 3, as shown in FIG. 8. As it is pushed into the card slot 3, the memory card 24 pushes against some of the pins 4, 4a into their respective pin cavities 5 (FIGS. 2 and 3) against the bias imparted by the springs 6 in the pin cavities 5. The memory card 24 is pushed completely into the card slot 3 until the electrical contacts 25 on the end of the memory card 24 contact the respective pins 12, 12a in the end of the card slot 3, as shown in FIG. 9. Alternatively, as shown in FIGS. 6, 7, 10 and 11, in the event that the card's electrical contacts 25 are on one or both surfaces of the memory card 24, one or more of the pins 4, 4a contacts the electrical contacts 25. The springs 6 (FIGS. 2 and 3) in the respective pin cavities 5 push the pins 4, 4a against the respective surfaces of the memory card 24 to hold the memory card 24 in the card slot 3.

Based on the geometrical configuration defined by the pins 4, 4a which are contacted and pushed into their respective pin cavities 5 by the memory card 24, the controller chip 15 identifies the particular type of memory card 24 which is inserted in the card slot 3. For that particular type of memory card 24, the controller chip 15 then determines which of the pins 4, 4a, 12 and 12a forms the electronic connection point with the electrical contact or contacts 25 of the memory card 24. Next, the electronic specifications of the memory card 24 are loaded from the memory card 24 to the controller chip 15, and the pins 4, 4a, 12 and 12a which form the electronic connection point with the memory card 24 are enabled to read and/or write data on the memory card 24.

After the reading and/or writing of data on the memory card 24 is completed, the memory card 24 is ejected from the card slot 3. This may be carried out by pushing the card ejection button 18, thus causing the card ejection mechanism (FIG. 5) to push the memory card 24 from the card slot 3. Simultaneously, the springs 6 push the pins 4, 4a from the respective pin openings 5, as shown in FIGS. 2 and 3.

As shown in FIG. 7, it will be appreciated by those skilled in the art that in the event that the memory card 3 is rotated or shifts in the card slot 3, as in the case of an MMC (Multi-Media Card), the controller chip 15 is still capable of ascertaining the type of memory card 24 which is inserted in the card slot 3. Furthermore, the universal card reader 1 need not utilize multiple card slots each of which is configured for a different memory card, since the card slot 3 is capable of accommodating memory cards of any size, type or configuration. Moreover, for those memory cards having an electrical contact on the upper and/or lower side of the card, a user need not insert the memory card 3 in the card slot 3 with the correct side facing up since either the lower vertical pins 4 or the upper vertical pins 4a can be used as the I/O for the read/write apparatus (not shown). Additionally, the card slot 3 may be sized in such a manner that two or more memory cards 24 may be simultaneously accommodated in the card slot 3 for the simultaneous reading and/or writing of data on the memory cards 24. When incorporated into a notebook computer (not shown), PDA (not shown) or the like, the universal card reader 1 is capable of saving panel space by eliminating the need for multiple card slots capable of accommodating memory cards of various types. The controller chip 15 may be provided with the capability to recognize the specifications of various device formats such as USB, PCI, ISA, PCMCIA, FireWire, etc. and to convert signals between such devices and the universal card reader 1, and an associated connection interface 16 for connection to the devices.

While the preferred embodiments of the invention have been described above, it will be recognized and understood that various modifications can be made in the invention and the appended claims are intended to cover all such modifications which may fall within the spirit and scope of the invention.

What is claimed is:

1. A universal card reader, comprising:
   a housing having a card slot adapted to receive at least one memory card;
   a dynamic input area comprising a plurality of sensors provided in said card slot, said plurality of sensors adapted to sense said at least one memory card within said card slot; and
   a controller chip connected to said dynamic input area, said controller chip adapted to determine said geometric shape and size of said memory card in response to said plurality of sensors, said controller chip further adapted to establish communication between said controller chip and said memory card based on said determined geometric shape and size of said memory card.

2. The universal card reader of claim 1 wherein said controller is further adapted to determine said memory card type using said geometric shape and size of said memory card shape and memory card size, said controller chip further adapted to select a subset of said plurality of sensors to establish said communication.

3. The universal card reader of claim 1 wherein said plurality of sensors comprises a plurality of biased pins carried by said housing and normally extending into said card slot.

4. The universal card reader of claim 3 wherein said plurality of biased pins comprises an electronic probe associated with each of said plurality of plurality of biased pins, said electronic probe adapted to sense movement of said biased pins, said electronic probe connected to said controller chip.

5. The universal card reader of claim 3 wherein said plurality of biased pins comprises a pressure sensor associated with each of said plurality of biased pins, said pressure sensor adapted to sense movement of said biased pins, said pressure sensor connected to said controller chip.

6. The universal card reader of claim 3 wherein each of said plurality of pins has a generally cylindrical shape.

7. The universal card reader of claim 3 wherein each of said plurality of pins has a generally conical shape.

8. The universal card reader of claim 3 wherein each of said plurality of pins has a length of about 0.1 mm to about 10 mm.

9. The universal card reader of claim 3 wherein each of said plurality of pins has a width of about 0.01 mm to about 2 mm.

10. The universal card reader of claim 1 further comprising a card ejection mechanism carried by said housing.

11. The universal card reader of claim 10 further comprising an ejection button carried by said housing and connected to said card ejection mechanism.

12. The universal card reader of claim 1 further comprising a device connection interface carried by said controller chip.

13. A universal card reader, comprising:
   a housing having a card slot adapted to receive at least one memory card;
   a dynamic input area provided in said card slot, said dynamic input area comprising a plurality of upwardly-biased lower vertical pins and a plurality of downwardly-biased upper vertical pins carried by said housing, said dynamic input area adapted to sense movement of said biased vertical pins in response to said at least one memory card within said card slot; and
   a controller chip connected to said dynamic input area, said controller chip adapted to determine said geometric shape and size of said memory card, said controller chip further adapted to select a subset of said plurality of biased vertical pins to establish communication between said controller chip and said memory card.

14. The universal card reader of claim 13 further comprising a plurality of pin cavities provided in said housing and wherein said plurality of lower vertical pins and said plurality of upper vertical pins are provided in said plurality of pin cavities, respectively.

15. The universal card reader of claim 14 further comprising an electronic probe associated with each of said plurality of pin cavities, said electronic probe adapted to sense the presence of a compressed pin, said electronic probe connected to said controller chip.

16. The universal card reader of claim 14 further comprising a pressure sensor provided in each of said pin cavities, said pressure sensor adapted to sense the presence of a compressed pin, said pressure sensor connected to said controller chip.

17. The universal card reader of claim 13 further comprising a plurality of biased horizontal pins carried by said housing and extending into said card slot.

18. A method of reading and writing a memory card, comprising:
   providing a plurality of biased pins;
   compressing multiple ones of said plurality of pins by said memory card;
   grouping multiple ones of said plurality of pins into a single input for said memory card;
   determining a type of said memory card using a geometric shape and size of compressed ones of said plurality of pins; and
   reading and writing said memory card.

19. The method of claim 18 wherein said grouping multiple ones of said plurality of pins into a single input comprises grouping said plurality of pins into a single input on one side of said memory card.

20. The method of claim 18 wherein said grouping multiple ones of said plurality of pins into a single input comprises grouping said plurality of pins into a single input on one end of said memory card.

* * * * *